J. B. BEAUVAIS.
WATER HEATING APPARATUS.
APPLICATION FILED JAN. 11, 1913.
1,083,237.
Patented Dec. 30, 1913.
3 SHEETS—SHEET 1.
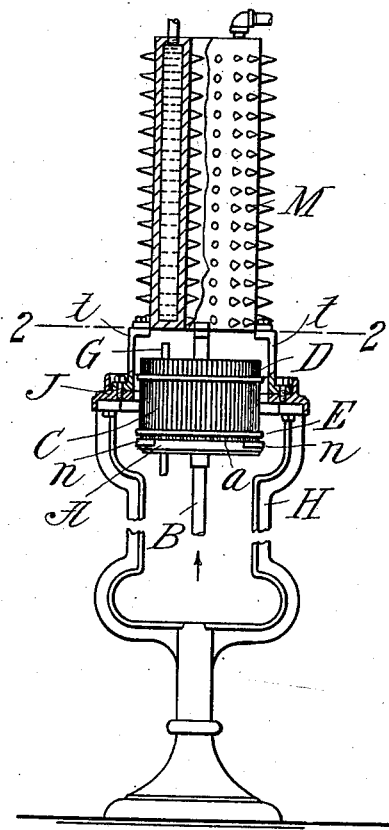
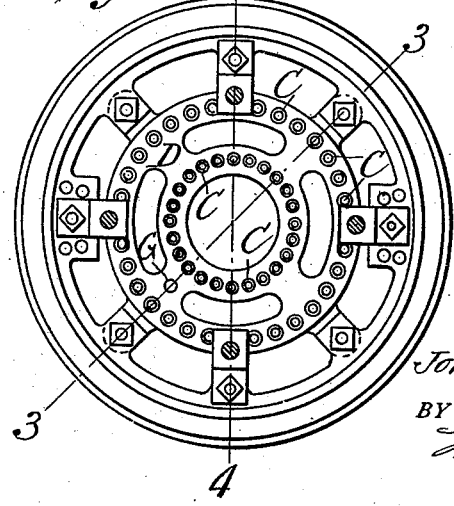
WITNESSES:
INVENTOR,
John B. Beauvais,
BY
ATTORNEY.

J. B. BEAUVAIS.
WATER HEATING APPARATUS.
APPLICATION FILED JAN. 11, 1913.
1,083,237.
Patented Dec. 30, 1913.
3 SHEETS—SHEET 2.
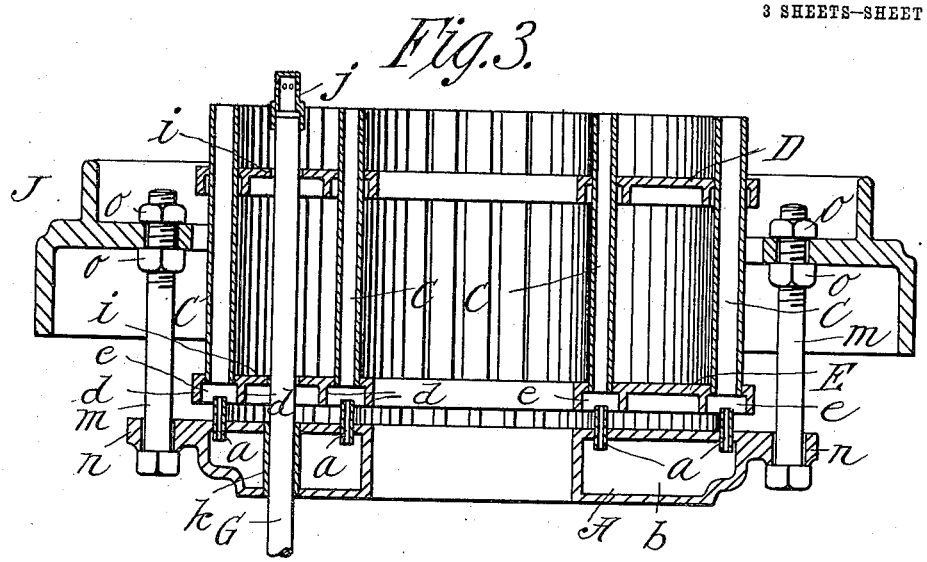
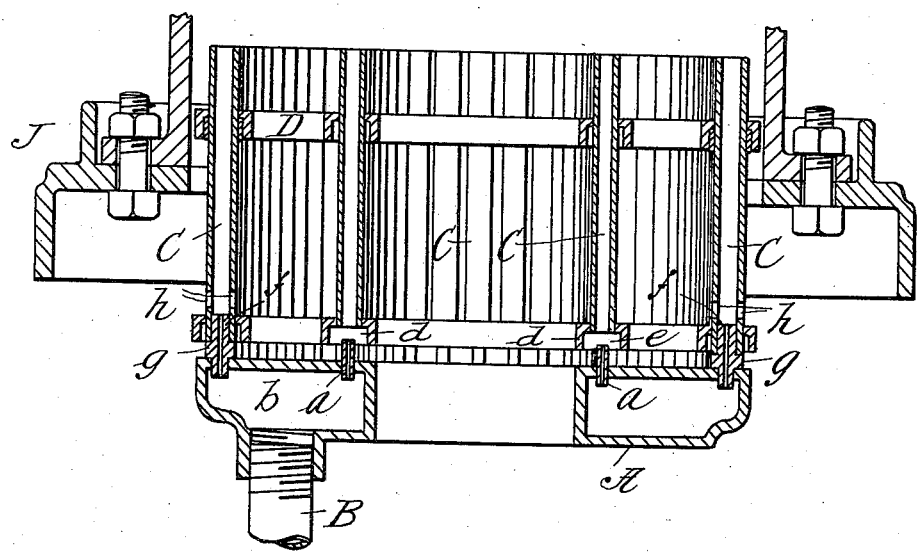
WITNESSES:
INVENTOR,
John B. Beauvais,
BY
ATTORNEY.

J. B. BEAUVAIS.
WATER HEATING APPARATUS.
APPLICATION FILED JAN. 11, 1913.
1,083,237.
Patented Dec. 30, 1913.
3 SHEETS—SHEET 3.
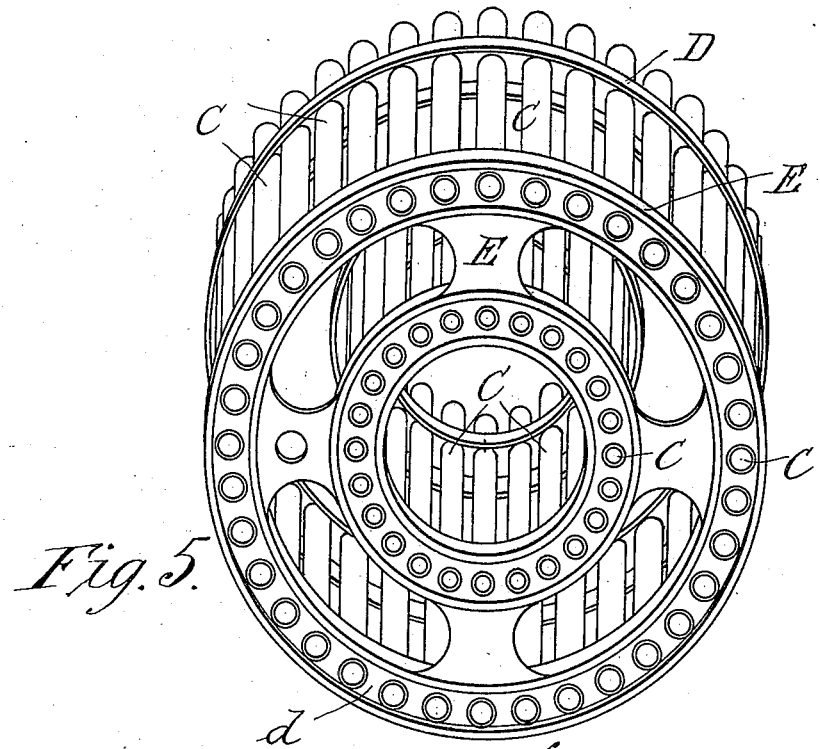
Fig. 5.
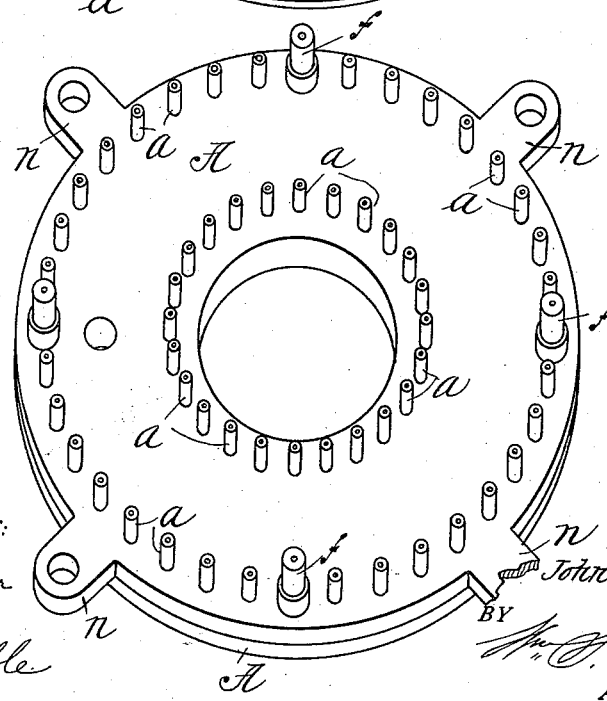
WITNESSES:
H. L. Sprague
W. P. Noble
INVENTOR,
John B. Beauvais,
BY
ATTORNEY.

UNITED STATES PATENT OFFICE.

JOHN B. BEAUVAIS, OF HOLYOKE, MASSACHUSETTS, ASSIGNOR TO THE BEAUVAIS WATER HEATER COMPANY, OF HOLYOKE, MASSACHUSETTS, A CORPORATION OF MASSACHUSETTS.

WATER-HEATING APPARATUS.

1,083,237.

Specification of Letters Patent. Patented Dec. 30, 1913.

Application filed January 11, 1913. Serial No. 741,456.

*To all whom it may concern:*

Be it known that I, JOHN B. BEAUVAIS, a citizen of the United States of America, and resident of Holyoke, in the county of Hampden and State of Massachusetts, have invented certain new and useful Improvements in Water-Heating Apparatuses, of which the following is a full, clear, and exact description.

This invention relates to an improved gas heating apparatus in which is especially comprised a gas burner having one or more circularly arranged burner tubes and especially designed to provide a circular flame or a circular flame encircled by another for the generation of intense heat from perfect combustion.

The burner is one especially suited for the heating of a boiler or water heater and especially an annular heater made or provided with radial studs or projections which extend outwardly and inwardly respectively from the outer and inner walls of such heater, such, for instance, as shown and described in Letters Patent of the United States granted to me Nov. 17th, 1908, No. 904,297.

Further objects of the invention are to increase the heating efficiency of the burner and by reason of the construction of the latter to render it susceptible of quick, easy and inexpensive manufacture, and to enable one portion of the burner to be separated and removed from another portion of the burner as occasion may require for the clearing of any of the numerous jet tubes or nipples of clogging matter.

The invention is described in conjunction with the accompanying drawings and is set forth in the claims.

In the drawings:—Figure 1 is a side elevation on a comparatively small scale showing the gas burner, a yoke-shaped stand by which it is supported and an annular heater supported by the stand above the burner. Fig. 2 is a plan view as seen below the line 2—2, Fig. 1 on a larger scale. Figs. 3 and 4 are central vertical sectional views, on a still larger scale, as taken on the lines 3—3 and 4—4, respectively on Fig. 2. Fig. 5 is a perspective view showing parts of the burner in separated relation.

Similar characters of reference indicate corresponding parts in all of the views.

The gas burner comprises, as to one department or portion, an annular inclosed casing A provided with inner and outer circularly arranged series of gas jet tubes or nipples at and upstanding above its top, having the axial passages therethrough of extremely slight diameter and connecting with the chamber $b$ in the casing into which the gas supply pipe B is connected. The chambered casing may advantageously be of cast iron and made with vertically drilled holes, through its upper wall in concentric circular arrangement and the jet tubes may be set in and through said holes in uniformly spaced arrangement with a tight driving fit. The burner, furthermore, comprises as to another portion or department thereof and which is separately made and separable from the jet tube provided chambered casing, inner and outer circularly and concentrically arranged sets of mixing tubes C C in number and arrangement corresponding to that of the jet tubes $a$.

The tubes C are of considerably greater diameter than the jet tubes and they are so united and supported as to have their lower ends above the top of the chambered casing, and they are so positioned above and relatively to the jet tubes that the passages through the latter are directed centrally into the lower ends of the tubes C having the passages of considerably greater diameter.

As here shown, the inner and outer sets of tubes C are held by upper and lower skeletonized or spider frames D and E, preferably of cast iron and having vertical round holes drilled therethrough with uniformity of spacing and in concentric circular line,—the tubes C, preferably of brass, having driving fits through the holes in the upper and lower frames D and E, thereby making a drum-like structure.

The lower spider frame especially is made with depending annular flanges $d$ $d$ forming downwardly opening annular channels $e$ $e$ at the under side of the ring frame E, into which, as clearly shown in Figs. 3 and 4, the jet tubes $a$ protrude.

Certain of the jet tubes,—in the present instance, 4 in number, and examples of which are represented at $f$ $f$ in Fig. 4, are made more bulky and higher and have shoulders $g$ $g$, located a short distance above the top wall of the chambered casing A.

The portions of these fittings $f$ above the shoulders are of diameter corresponding to the internal diameter of the mixing tubes C; and when the spider frame-united tubes C are brought to their proximate relations to the jet tubes $a$, the lower ends of four of the tubes C which are "at quarters" engage with a close fit over the portions of the tubular plugs $f$ and have rests or supporting bearings on the shoulders $g$, thereby keeping the lower spider frame E and the lower ends of all of the tubes C suitably above the top wall of the chambered casing, permitting free ingress of air to within the channels $e$ and thence upwardly into the tubes C, excepting the four which have steadying engagements at their lower end portions about the upstanding tubular plugs $f$; and these particular last mentioned tubes, as shown in Fig. 4, have apertures $h$, sidewise therethrough just above the top of the tubular plug $f$, so that thereby provision is made for air ingress to these tubes as well as the majority of the similar tubes comprised in the circular series.

G represents a pipe extending vertically through the burner, adapted for connection with a gas supply, independently of the gas supply for the chambered casing A,—the upper end of this tube or pipe G being suitably equipped as a pilot burner and having its position between and in suitable proximity to tubes C of the inner and outer circular series.

Vertical holes $i$ are made through the upper and lower spider frames D and E for the accommodation of the pilot burner pipe loosely therethrough, and the burner head $j$ for the pilot light is easily removable from the upper end of the tube G, and where such tube passes upwardly through the chambered casing A, a bushing $k$ forms a wall for the pipe accommodating opening, all as shown in Fig. 3 of the drawings.

The tube sets and connecting supporting and steadying spider frame may as a unit be lifted upwardly clear and away from the jet tube provided chambered casing, thereby enabling one to clear any of the restricted jet tube passages of obstructions which may have accumulated in one or more thereof.

As shown in Fig. 1, a stand is provided having a yoke-shaped upper portion H at the top of which is an annular frame J loosely encircling the upper drum-like portion of the burner. This annular frame has depending bolts $m$ $m$, the shanks of which penetrate the perforations in outwardly extended ear-lugs of the chambered casing,— the heads of such bolts having supporting engagements with the lower sides of such ear lugs,—while the nuts $o$ $o$ at the threaded upper extremities of the bolts form the means of detachably locking such bolts to the annular frame.

An annular heater for water M is represented in Fig. 1, the same being of substantially the character covered in my aforementioned already issued patent; and this is shown as supported suitably above the top of the burner by the upstanding brackets $t$ $t$ which rest on the aforementioned annular frame J, and have bolted connections with the base portion of the heater.

The burner when lighted gives circular outer and inner flames, for the consumption of the gas with perfect combustion, the outer circular flame impinging against the external wall of the heater and against the outwardly projecting studs thereof while the inner flame extends up within the inner openings within the heater for impingement against the internal wall of the latter and against the radial inwardly projecting studs thereof with the result that water in the heater may be brought to a suitably high temperature or steam generated therein with extreme rapidity.

While the burner described has been primarily designed for use in conjunction with an annular chambered heater of the type referred to, its use obviously is not confined thereto, for it is susceptible of highly advantageous employment in many other situations.

My invention is not to be considered as restricted to the exact details of construction described and shown, for various changes may be made within the purview of the appended claims without departure from the invention or sacrifice of the advantages thereof.

I claim:—

1. A gas burner comprising a circular casing having a gas inlet and provided with a series of circularly arranged tubes at and upstanding above its top, the passages thereof being of slight diameter and connecting with the chamber of the casing, certain of said upstanding tubes being of increased diameter and made with shoulders, above the top of the casing, a series of vertical tubes corresponding to the said upstanding tubes having the passages therethrough of considerably greater diameter than those in the upstanding tubes and into the lower portions of which said upstanding tubes are directed, certain of said latter named tubes resting on and supported by said shoulders, and means for the ingress of air at the lower portions of the second named series of tubes.

2. A gas burner comprising a circular casing having a gas inlet and provided with a circularly arranged series of tubes at and upstanding above its top, having the axial passages therethrough of slight diameter and connecting with the chamber in the casing, a ring frame and means for supporting it above the top of the casing having a circular container in its under side, a plurality of mixing tubes carried by said ring frame, the lower ends of which extend through a portion of such frame which forms the upper wall of said circular container and into the lower ends of which the upstanding tubes are directed, and additional means above said ring frame for connecting and maintaining the tubes in parallelism.

3. A gas burner comprising a circular casing having a gas inlet and provided with inner and outer circularly arranged series of tubes at and upstanding above its top, having the axial passages therethrough of slight diameter and connecting with the chamber in the casing, a ring frame and means for supporting it above the top of the casing, said frame having inner and outer circular channels in its under side, inner and outer circular series of mixing tubes carried by said ring frame, the lower ends of which extend through portions of such frame which form the upper walls of said circular channels and into the lower ends of which the upstanding tubes are directed, and additional means above said ring frame for connecting and maintaining the tubes in parallelism.

4. A gas burner comprising a circular casing having a gas inlet and provided with a series of circularly arranged tubes at and upstanding above its top, the passages thereof being of slight diameter and connecting with the chamber of the casing, certain of said upstanding tubes being of increased diameter and made with shoulders, above the top of the casing, a series of vertical tubes corresponding to the said upstanding tubes having the passages therethrough of considerably greater diameter than those in the majority of the upstanding tubes and into the lower portions of which said upstanding tubes are directed, certain of said latter named tubes resting on and supported by said shoulders, and fitting the portions of the shouldered tubes above such shoulders and having sidewise air ingress openings at their lower portions but above the upper ends of the upstanding shouldered tubes.

5. A chambered casing having a gas inlet and provided with gas jet-tubes upstanding above its top wall, and also having upstanding dowel-like members shouldered above the casing top, a plurality of vertical tubes having arrangement corresponding to that of the jet tubes and a frame uniting such tubes and provided with downwardly open tubular members to fit said dowel-like members and to rest on the shoulders thereof, and supporting the frame-united tubes with their lower ends above the tops of the gas jet tubes.

6. A gas burner comprising a casing having a circular series of small burner tubes projecting through its top, a ring frame having an annular channel in its lower side, a series of mixing tubes projecting upward from holes in the upper wall of the said channel, said ring frame being supported on the casing with the burner tubes extending into the said channel portion of the frame.

Signed by me at Springfield, Mass., in presence of two subscribing witnesses.

JOHN B. BEAUVAIS.

Witnesses:
 ARLAN M. SPENCER,
 WM. S. BELLOWS.

Copies of this patent may be obtained for five cents each, by addressing the "Commissioner of Patents, Washington, D. C."